(12) United States Patent
Kouno et al.

(10) Patent No.: US 10,082,405 B2
(45) Date of Patent: Sep. 25, 2018

(54) POSITION DETECTOR WITH A MINIMUM MAGNETIC FLUX DENSITY POSITION SHIFTED FROM A CENTER OF A GAP

(71) Applicant: DENSO CORPORATION, Kariya, Aichi-pref. (JP)

(72) Inventors: Naoaki Kouno, Chiryu (JP); Tetsuji Yamanaka, Obu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/809,301

(22) Filed: Nov. 10, 2017

(65) Prior Publication Data

US 2018/0066964 A1    Mar. 8, 2018

Related U.S. Application Data

(63) Continuation of application No. 14/142,168, filed on Dec. 27, 2013, now Pat. No. 9,857,200.

(30) Foreign Application Priority Data

Dec. 27, 2012   (JP) ................... 2012-286098

(51) Int. Cl.
  *G01B 7/30*    (2006.01)
  *G01D 5/14*    (2006.01)
(52) U.S. Cl.
  CPC ............... *G01D 5/145* (2013.01); *G01B 7/30* (2013.01)
(58) Field of Classification Search
  CPC .. G01R 33/0094; G01R 15/20; G01R 15/202; G01R 15/205; G01R 33/06; G01R 33/07;

(Continued)

(56) References Cited

U.S. PATENT DOCUMENTS 4,810,965 A    3/1989  Fujiwara et al.
6,414,482 B1 *  7/2002  Mase ................... F02D 11/106
                                                324/207.2

(Continued)

FOREIGN PATENT DOCUMENTS

JP    63-009743 A    1/1988
JP    08-292004 A   11/1996

(Continued)

OTHER PUBLICATIONS

English Machine Translation of the Description of JP 08-292004, obtained from EPO website (http://worldwide.espacenet.com/advancedSearch?locale=en_EP), obtained on Jan. 9, 2016.

(Continued)

*Primary Examiner* — David M. Schindler
(74) *Attorney, Agent, or Firm* — Nixon & Vanderhye P.C.

(57) ABSTRACT

A position detector includes a magnet disposed between first ends of first and second magnetic flux transmission parts and a magnet disposed between second ends of the first and second magnetic flux transmission parts. The position detector also includes a Hall IC that is positioned within a gap and moves relative to a rotating body. The Hall IC detects a density of the magnetic flux from the first and second magnetic flux transmission parts and outputs a signal according to the density of the magnetic flux passing therethrough in order to detect a position of a detection object. A minimum magnetic flux density position within the gap may be shifted to a position having the highest detection accuracy such that the position detection accuracy of the detection object is improved.

4 Claims, 10 Drawing Sheets

(58) Field of Classification Search
CPC .. G01R 33/072; G01R 33/075; G01R 33/077; G01R 33/09; G01R 33/091; G01R 33/093; G01R 33/095; G01R 33/096; G01R 33/098; G01D 5/145; G01D 5/225; G01D 5/2258; G01D 5/2266; G01D 5/2275; G01D 5/2283; G01D 5/2026; G01D 5/2033; G01D 5/204; G01D 5/2046; G01D 5/2053; G01D 5/206; G01D 5/22; G01D 5/2208; G01D 5/2216; G01D 5/2225; G01D 5/2233; G01D 5/2241; G01D 5/14; G01D 5/142; G01D 5/147; G01D 5/16; G01D 5/20; G01D 5/2006; G01D 5/2013; G01D 5/202; G01B 7/305; G01B 7/31; G01B 7/312; G01B 7/30; G01B 7/02; G01B 7/023; G01B 7/04; G01B 7/046; G01B 7/14; H01L 43/00; H01L 43/06; H01L 43/08
See application file for complete search history.

(56) References Cited

U.S. PATENT DOCUMENTS

| 7,463,023 | B1 | 12/2008 | Moreno et al. | |
| 2001/0009366 | A1* | 7/2001 | Kono | G01D 5/145 |
| | | | | 324/207.2 |
| 2002/0118011 | A1 | 8/2002 | Wolf | |
| 2002/0186009 | A1 | 12/2002 | Makino et al. | |
| 2004/0061495 | A1 | 4/2004 | Shimomura et al. | |
| 2014/0103911 | A1* | 4/2014 | Honda | G01D 5/14 |
| | | | | 324/207.2 |

FOREIGN PATENT DOCUMENTS

| JP | 10-104044 A | 4/1998 |
| JP | 2009-085913 A | 4/2009 |
| JP | 2012-220481 A | 11/2012 |
| JP | 2014-126553 A | 7/2014 |

OTHER PUBLICATIONS

English Machine Translation of the Description of JP 2012-220481, obtained from EPO website (http://worldwide.espacenet.com/advancedSearch?locale=en_EP), obtained on Jan. 9, 2016.
Feb. 26, 2015 Office Action issued in Japanese Application No. 2012-286098 (with translation).
Kouno, et al., U.S. Appl. No. 14/142,434, filed Dec. 27, 2013.
Kouno, et al., U.S. Appl. No. 14/142,456, filed Dec. 27, 2013.
Kouno, et al., U.S. Appl. No. 14/142,195, filed Dec. 27, 2013.
Kouno, et al., U.S. Appl. No. 14/142,154, filed Dec. 27, 2013.
Kouno, et al., U.S. Appl. No. 14/142,146, filed Dec. 27, 2013.
Nov. 13, 2014 Office Action issued in Japanese Application No. 2012-286098 (with translation).
Amanaka, et al., U.S. Appl. No. 14/142,133, filed Dec. 27, 2013.

* cited by examiner

POSITION DETECTOR WITH A MINIMUM MAGNETIC FLUX DENSITY POSITION SHIFTED FROM A CENTER OF A GAP

CROSS-REFERENCE TO RELATED APPLICATION

This application is a divisional of U.S. application Ser. No. 14/142,168, filed Dec. 27, 2013, which claims the benefit of priority of Japanese Patent Application No. 2012-286098 filed on Dec. 27, 2012, the disclosures of which are incorporated herein by reference.

TECHNICAL FIELD

The present disclosure generally relates to a position detector for detecting a position of a detection object.

BACKGROUND

Generally, a magnetic-type position detector detects a change in the position of a detection object relative to a reference part. The magnetic-type position detector may utilize a magnetic flux generator such as a magnet. For example, a position detector disclosed in a patent document 1 (i.e., Japanese Patent Laid-Open No. JP-A-H08-292004) is configured to form a closed magnetic circuit having two magnets and two magnetic flux transmission parts that are disposed on a reference part. In such structure, the two magnets are respectively bound by the ends of the two mutually-facing magnetic flux transmission parts. A flow of spill magnetic fluxes from one transmission part to the other occurs within a gap between the respective ends of the two magnetic flux transmission parts. A magnetic flux density detector is configured to move together with the detection object within the gap between the two magnetic flux transmission parts and to output a detection signal according to the magnetic flux passing therethrough. In such manner, the position detector detects the position of the detection object relative to the reference part based on an output signal that is output from the magnetic flux detector.

In the position detector of a patent document 1, two magnets of the same magnet type having the same volume are disposed at both ends of each of the two magnetic flux transmission parts, with the polarity of the two magnets arranged in opposite directions to each other. Therefore, at the center of the gap between the two magnetic flux transmission parts, the direction of the magnetic flux is reversed. In other words, a center position of a movable range of the detection object and the magnetic flux density detector is a position where an absolute value of the magnetic flux density decreases to a minimum value (hereinafter "minimum MF density position").

Generally, it is observed that the minimum magnetic flux density position within the movable range of the detector provides temperature-resistance against the effects of temperature changes due to the detector environment. That is, at such a position, the magnetic power of the magnets changes minimally even when the temperature of the detector environment changes (i.e., a temperature coefficient of the magnetic flux generator is low at such position). In other words, at the minimum magnetic flux density position, a position detection accuracy of the detector is higher than at other positions. Such a characteristic of the detector in the patent document 1 is perceived as having lower position detection accuracy at positions other than the center position of the detector movable range. That is, at both ends of the detector movable range (i.e., the gap), for example, the position detection accuracy of the detector may be low. Such a characteristic of the detector may also be interpreted as having a high position detection accuracy that occurs only at a center position of the detector movable range, which may be undesirable in some applications. That is, for example, when high position detection accuracy is required at both ends of the detector movable range, a position detector having low position detection accuracy at the ends of the detector movable range may not be suitable for certain applications.

SUMMARY

It is an object of the present disclosure to provide a position detector having improved position detection accuracy and temperature resistance.

In an aspect of the present disclosure, the position detector detects a position of a detection object that moves relative to a reference part. The position detector includes a first magnetic flux transmission part disposed on one of the detection object or the reference part, the first magnetic flux transmission part having a first end and a second end and a second magnetic flux transmission part disposed to define a gap between the first magnetic flux transmission part and the second magnetic flux transmission part, the second magnetic flux transmission part having a first end and a second end. A first magnetic flux generator is disposed at a position between the first end of the first magnetic flux transmission part and the first end of the second magnetic flux transmission part and a second magnetic flux generator is disposed at a position between the second end of the first magnetic flux transmission part and the second end of the second magnetic flux transmission part. A magnetic flux density detector (i) is disposed on an other of the detection object or the reference part to be movable within the gap relative to the one of the detection object or the reference part and (ii) outputs a signal according to a density of a magnetic flux passing through the magnetic flux density detector. A minimum magnetic flux density position of the magnetic flux density detector within the gap, where an absolute value of the density of the magnetic flux passing through the magnetic flux density detector decreases to a minimum, is set to a position that is shifted away from a center of the gap by a predetermined distance toward one of the first magnetic flux generator or the second magnetic flux generator.

Further, the first magnetic flux generator is a permanent magnet, the second magnetic flux generator is a permanent magnet, and at least one of a magnet volume, a magnet type, a magnet material composition, or a magnetization adjustment method of the first magnetic flux generator is different from the second magnetic flux generator.

Moreover, the first magnetic flux generator has at least one permanent magnet, the second magnetic flux generator has a different number of permanent magnets than the first magnetic flux generator, and identical permanent magnets are used for the at least one permanent magnet of the first magnetic flux generator and the different number of permanent magnets of the second magnetic flux generator.

In addition, a third magnetic flux transmission part made of an identical material as the first magnetic flux transmission part and the second magnetic flux transmission part. The third magnetic flux transmission part replaces one of the first magnetic flux generator or the second magnetic flux generator.

Additionally, the thickness of at least one of the first magnetic flux transmission part or the second magnetic flux transmission part changes in a direction from the first magnetic flux generator to the second magnetic flux generator.

Furthermore, the detection object rotates relative to the reference part, and the first magnetic flux transmission part and the second magnetic flux transmission part have a curved shape that is concentric to a center of rotation of the detection object.

Even further, the detection object moves linearly relative to the reference part, and the first magnetic flux transmission part and the second magnetic flux transmission part have a straight shape that extends along a path of relative movement of the detection object.

Moreover, in another aspect of the present disclosure, the position detector detects a position of a detection object that moves relative to a reference part. The position detector includes a first magnetic flux transmission part disposed on one of the detection object or the reference part, the first magnetic flux transmission part having a first end and a second end, and a second magnetic flux transmission part disposed to define a gap between the first magnetic flux transmission part and the second magnetic flux transmission part, the second magnetic flux transmission part having a first end and a second end. A magnetic flux generator disposed at a position between the first end of the first magnetic flux transmission part and the first end of the second magnetic flux transmission part. A magnetic flux density detector (i) is disposed on an other of the detection object or the reference part to be movable relative to the one of the detection object or the reference part within the gap and (ii) outputs a signal according to a density of a magnetic flux passing therethrough. A minimum magnetic flux density position of the magnetic flux density detector within the gap, where an absolute value of the density of the magnetic flux passing through the magnetic flux density detector decreases to a minimum, is set to a position that is shifted away from a center of the gap by a predetermined distance away from the magnetic flux generator.

In other words, the position detector detects a relative move position of a detection object, which is a position after a relative move of the detection object relative to a reference part, the detector includes: a first magnetic flux transmission part, a second magnetic flux transmission part, a first magnetic flux generator, a second magnetic flux generator, and a magnetic flux density detector.

The first magnetic flux transmission part is disposed on one of the detection object and the reference part. The second magnetic flux transmission part is disposed on one of the detection object or the reference part, so that a gap is formed at a position between the first and second magnetic flux transmission parts.

In other words, the first magnetic flux generator is disposed at a position between a first end of the first magnetic flux transmission part and first end of the second magnetic flux transmission part. Thereby, the magnetic flux generated by the first magnetic flux generator is transmitted from the first end of the first and second magnetic flux transmission parts to a second end of first and second magnetic flux transmission parts.

The second magnetic flux generator is disposed at a position between the second end of the first magnetic flux transmission part and the second end of the second magnetic flux transmission part. Thereby, the magnetic flux generated by the second magnetic flux generator is transmitted from the second end of the first and second magnetic flux transmission parts to the first end of first and second magnetic flux transmission parts.

The magnetic flux density detector is disposed on the one of the detection object or the reference part so that the detector is movable relative to the other of the detection object or the reference part in the gap between the first and second magnetic flux transmission parts. The magnetic flux density detector outputs a signal according to a density of the magnetic flux passing through the detector. In such a structure, the magnetic flux passing through the magnetic flux density detector is, mainly, a spill magnetic flux, which flows through the gap between the first and second magnetic flux transmission parts from one of the two transmission parts to the other (i.e., the magnetic flux flowing either from the first part to the second part or from the second part to the first part).

By devising the above-mentioned configuration, the position detector is enabled to detect a position of the detection object relative to the reference part based on the signal outputted by the magnetic flux density detector.

In the present disclosure, a minimum magnetic flux (MF) density position, where an absolute value of a magnetic flux density detected and output by the magnetic flux density detector decreases to a minimum, is set at a position that is shifted away from a center of the movable range of the detector by a predetermined distance to the left or to the right, that is, toward the first or second magnetic flux generator along a range of relative movement of the detector. That is, in other words, the minimum MF density position having the minimum absolute magnetic flux density value is set at a position that is shifted position away from the center position of the movable range of the detection object. Therefore, the minimum MF density position may be moved and set at a position where the highest detection accuracy is required for the accurate position detection of the detection object.

Generally, it is observed that the minimum MF density position within the movable range of the detector provides a good temperature-proofing character for the temperature change of the detector environment, because, at such a position, the magnetic power of a magnetic flux generator (i.e., the magnets) is changes minimally even when the temperature of the detector environment is changed (i.e., a temperature coefficient of the magnetic flux generator is low at such position). Therefore, in the present disclosure, the position detection accuracy at any position within the movable range of the detection object is improved irrespective of the temperature.

BRIEF DESCRIPTION OF THE DRAWINGS

Other objects, features and advantages of the present disclosure become more apparent from the following detailed description made with reference to the accompanying drawings, in which.

DETAILED DESCRIPTION

Figure 1:
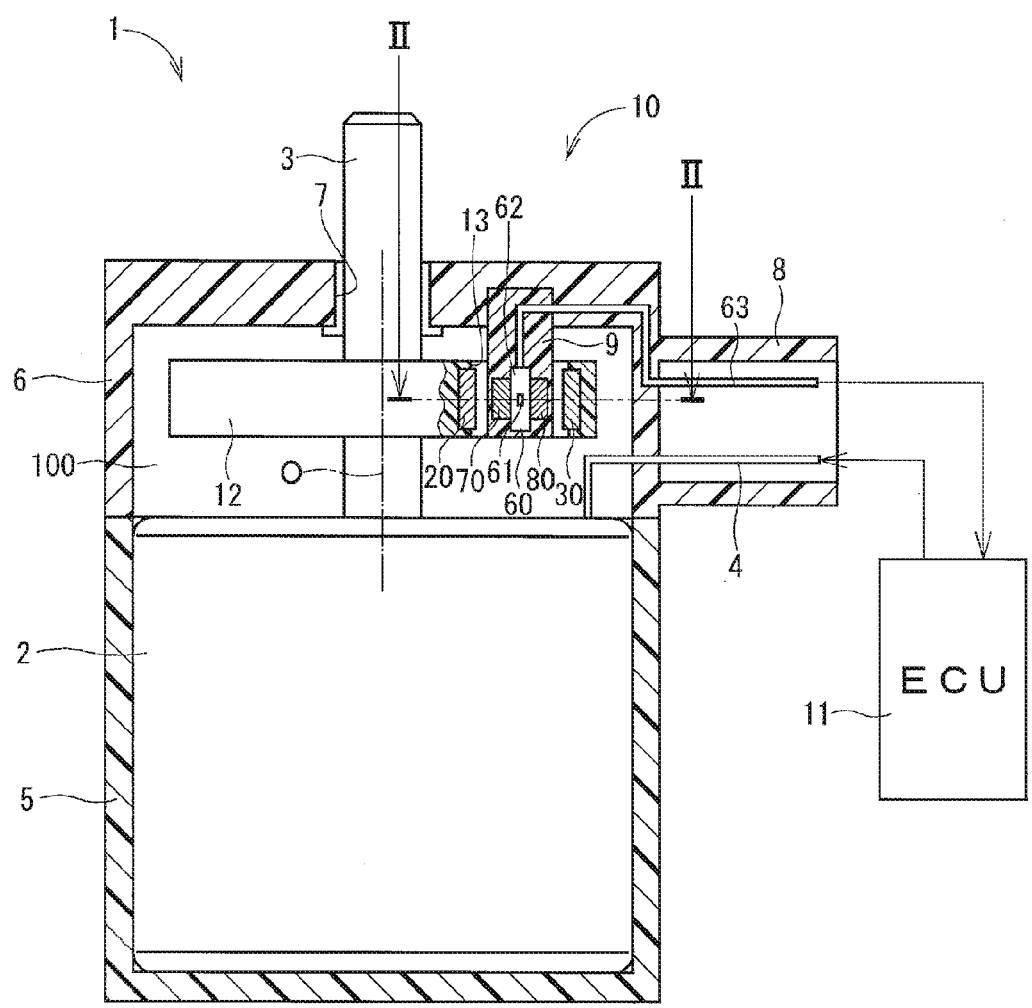
FIG. 1 is a sectional view of a position detector and an actuator in a first embodiment of the present disclosure.

Hereafter, the position detector in plural embodiments of the present disclosure and the actuator using the same are explained based on the drawing. In the plural embodiments, the same numerals are assigned to the same components, and explanation of the same components will not be repeated.

First Embodiment

Figure 2:
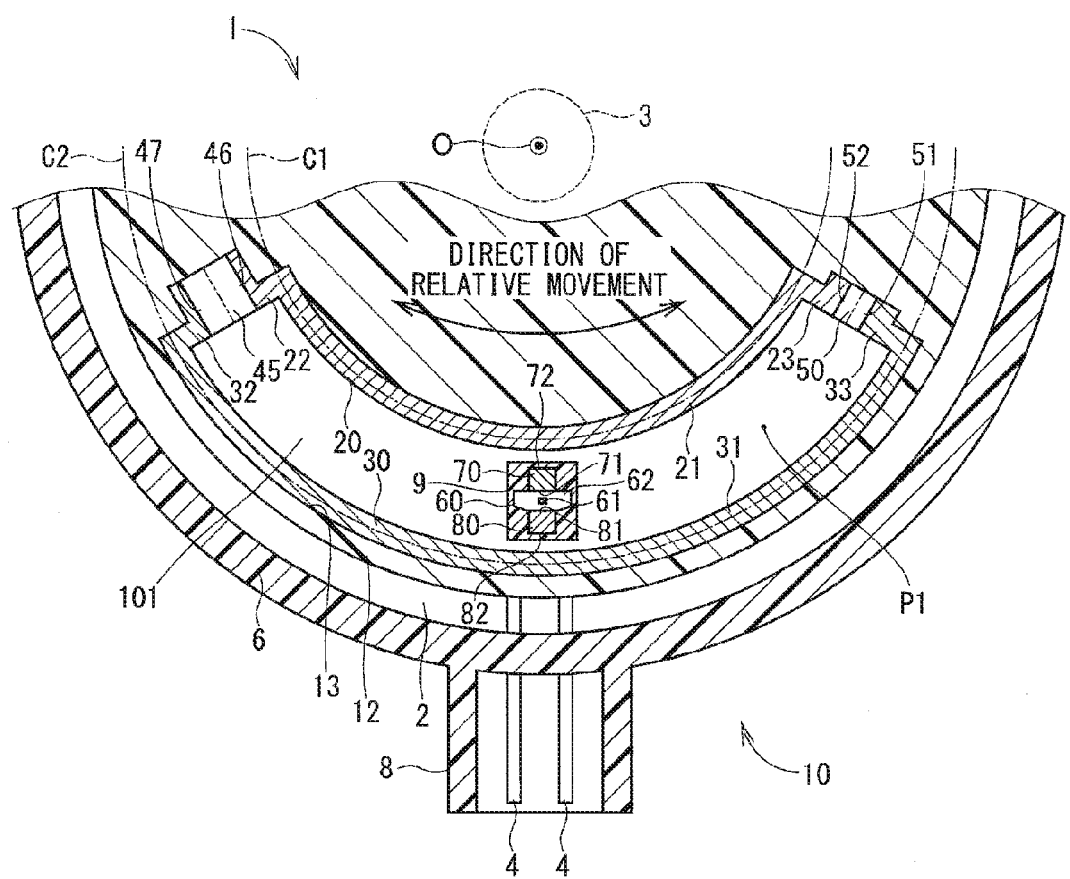
FIG. 2 is a sectional view along line II-II of FIG. 1.
Figure 3A:
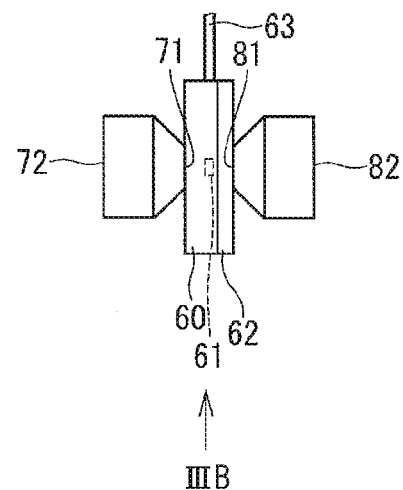
FIGS. 3A, 3B, and 3C are views of a magnetic flux collector in a first embodiment of the present disclosure.
Figure 3B:
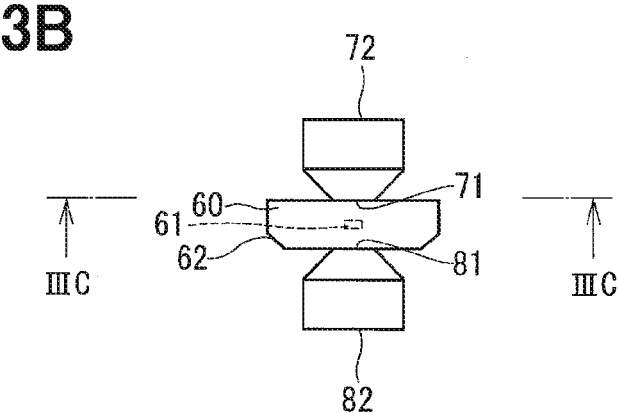
Figure 3C:
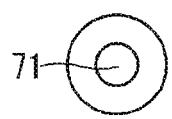

The position detector in the first embodiment of the present disclosure and the actuator using the same are shown in FIGS. 1 and 2.

An actuator 1 is used as a driving power source which drives a throttle valve of a vehicle (not illustrated), for example. The actuator 1 is provided with a motor 2, a housing 5, a cover 6, an electronic control unit (hereinafter "ECU") 11, a rotating body 12, a position detector 10, together with other parts.

As shown in FIG. 1, the motor 2 has an output shaft 3, a motor terminal 4 and the like. An electric power is supplied to the motor 2 via the motor terminal 4. The motor 2 rotates by receiving the electric power from the terminal 4. Rotation of the motor 2 is outputted from the output shaft 3. The output shaft 3 is connected to a throttle valve via a geartrain (not illustrated) or the like, for example. Therefore, when the motor 2 rotates, the throttle valve also rotates.

The housing 5 is made of resin to have a cylinder shape with a bottom, for example, and has the motor 2 accommodated in an inside thereof.

The cover 6 is made of resin to have a cylinder shape with a bottom, for example, and has its opening abutted to an opening of the housing 5 in a state that the output shaft 3 inserted into a cavity 7 which is bored on the bottom of the cover 6. In such manner, a hollow space 100 is defined at a position between the cover 6 and the motor 2.

The cover 6 has a connector 8 formed in a pipe shape and extending in a radial outside direction from a cylinder shape body of the cover 6. In the connector 8, an end of the motor terminal 4 is exposed. The connector 8 is connected to an end of a wire harness leading to the ECU 11. Thereby, the electric power from the battery (not illustrated) is supplied to the motor 2 via the ECU 11, the wire harness, and the motor terminal 4.

The ECU 11 is a computer provided with a CPU serving as a calculation unit together with ROM, RAM serving as a memory unit, an input/output interface and other parts. The ECU 11 controls the operation of the various devices installed in the vehicle based on the signal from various sensors attached to various parts of the vehicle.

The ECU 11 controls the electric power supplied to the motor 2, for example, based on an accelerator opening signal from an accelerator pedal, or the like. When the electric power is supplied to the motor 2, the motor 2 rotates to rotate a throttle valve. Therefore, the throttle valve opens and closes an air intake passage, and an amount of an intake air flowing through the air intake passage is adjusted. In the present embodiment, the ECU 11 may also control a supply of the electric power to the motor 2 by an idle speed control (ISC) function, for example, irrespective of the opening signal from the accelerator pedal.

The rotating body 12 is, for example, made of resin to have a disc shape, and is disposed in the hollow space 100. The rotating body 12 is fixed onto the output shaft 3 with the output shaft 3 extending therethrough at its center. Therefore, when the output shaft 3 rotates, the rotating body 12 rotates together with the output shaft 3. Since the output shaft 3 and the throttle valve are connected by the geartrain, the rotation position of the rotating body 12 corresponds to the rotation position of the throttle valve.

According to the present embodiment, the position detector 10 detects the rotation position of the rotating body 12 that moves and rotates relative to the cover 6. Therefore, by detecting the rotation position of the rotating body 12 which rotates relative to the cover 6, the rotation position of the throttle valve is detected and an opening degree of the throttle valve is also detected. Thus, the position detector 10 is capable of serving as a throttle position sensor.

As shown in FIGS. 1 and 2, the position detector 10 includes a first magnetic flux transmission part 20, a second magnetic flux transmission part 30, a magnet 45 serving as a first magnetic flux generator, a magnet 50 serving as a second magnetic flux generator, a Hall IC 60 serving as a magnetic flux density detector, a first magnetic flux collector 70 that concentrates a spill magnetic flux to flow the collected flux to the Hall IC 60, a second magnetic flux collector 80 and the like.

The first magnetic flux transmission part 20 is made of a material which has a relatively high magnetic permeability, such as a silicon steel, or the like. The first magnetic flux transmission part 20 is disposed in an arc-shape cavity 13 that is formed on the rotating body 12.

The first magnetic flux transmission part 20 has a center section 21, a first end 22, and a second end 23. The center section 21 has a shape which extends along a first virtual circle C1 that centers on a rotation axis O of the rotating body 12 (refer to FIG. 2). The first end 22 is formed to extend from one end of the center section 21 toward a radial outside of the first virtual circle C1. The second end 23 is formed to extend from the other end of the center section 21 toward the radial outside of the first virtual circle C1.

The second magnetic flux transmission part 30 is made of the material which has a relatively high magnetic permeability, such as a silicon steel or the like, similar to the first magnetic flux transmission part 20. The second magnetic flux transmission part 30 is disposed in the cavity 13 formed in the rotating body 12.

The second magnetic flux transmission part 30 has a center section 31, a first end 32, and a second end 33. The center section 31 has a shape which extends along a second virtual circle C2 that has a larger radius than the first virtual circle C1 and centers on the rotation axis O of the rotating body 12 (refer to FIG. 2). The first end 32 is formed to extend from one end of the center section 31 toward a radial inside of the second virtual circle C2. The second end 33 is formed to extend from the other end of the center section 31 to the radial inside of the second virtual circle C2.

In other words, the rotating body 12 rotates relative to the cover 6, and the first magnetic flux transmission part 20 and the second magnetic flux transmission part 30 have a curved shape that is concentric to a center of rotation of the rotating body 12.

As shown in FIGS. 1-4, the first magnetic flux transmission part 20 and the second magnetic flux transmission part 30 are disposed in the cavity 13 of the rotating body 12 so that the center section 21 of the first magnetic flux transmission part 20 and the center section 31 of the second magnetic flux transmission part 30 face each other in the radial direction of the first virtual circle C1. Thereby, an arc-shape gap 101 is formed between the center section 21 of the first magnetic flux transmission part 20 and the center section 31 of the second magnetic flux transmission part 30 (refer to FIG. 2).

The magnet 45 is a permanent magnet, such as a neodymium magnet, a ferrite magnet, or the like, for example. The magnet 45 has a magnetic pole 46 on one end, and has a magnetic pole 47 on the other end. The magnet 45 is magnetized so that a magnetic pole 46 side serves as an N pole, and a magnetic pole 47 side serves as an S pole. The magnet 45 is disposed at a position between the first end 22 of the first magnetic flux transmission part 20 and the first end 32 of the second magnetic flux transmission part 30 so that the magnetic pole 46 abuts the first end 22 of the first magnetic flux transmission part 20, and the magnetic pole 47 abuts the first end 32 of the second magnetic flux transmission part 30. Thereby, the magnetic flux generated by the magnetic pole 46 of the magnet 45 is transmitted from the first end 22 of the first magnetic flux transmission part 20 to the second end 23 via the center section 21.

The magnet 50 is also a permanent magnet, such as a neodymium magnet a ferrite magnet, or the like, for example, similar to the magnet 45. The magnet 50 has a magnetic pole 51 on one end, and has a magnetic pole 52 on the other end. The magnet 50 is magnetized so that a magnetic pole 51 side serves as an N pole, and a magnetic pole 52 side serves as an S pole. The magnet 50 is disposed at a position between the second end 33 of the second magnetic flux transmission part 30 and the second end 23 of the first magnetic flux transmission part 20 so that the magnetic pole 51 abuts the second end 33 of the second magnetic flux transmission part 30, and the magnetic pole 52 abuts the second end 23 of the first magnetic flux transmission part 20. Thereby, the magnetic flux generated by the magnetic pole 51 of the magnet 50 is transmitted from the second end 33 of the second magnetic flux transmission part 30 to the first end 32 via the center section 31.

Here, the spill magnetic flux flows through the gap 101, either from the first magnetic flux transmission part 20 to the second magnetic flux transmission part 30, or from the second magnetic flux transmission part 30 to the first magnetic flux transmission part 20.

In the present embodiment, the magnet 45 and the magnet 50 are configured to be the same type of permanent magnet (e.g., a neodymium magnet, a ferrite magnet, etc.), having the same magnet material composition and the same magnetization adjustment method. Regarding and the same magnetization adjustment method, if the magnets 45, 50 are ferrite magnets, for example, the magnets 45, 50 may contain the same percentage of neodymium, iron, boron and the same percentage composition of dysprosium, etc. or the percentage composition of barium, strontium, etc. However, the magnet 45 and the magnet 50 differ in volume. In the present embodiment, the magnet 45 has a larger volume than the magnet 50. Therefore, as shown in FIG. 2, the flow of the spill magnetic flux at a position P1 that is at a predetermined distance away from the longitudinal center toward the magnet 50 in the gap 101 is zero, while the flow of the same flux flows from the second magnetic flux transmission part 30 to the first magnetic flux transmission part 20 in an area between the position P1 and the magnet 50, and the flow of the same flux flows from the first magnetic flux transmission part 20 to the second magnetic flux transmission part 30 in an area between the position P1 and the magnet 45. More specifically, the closer the position along the longitudinal direction of the gap 101 is to the magnet 45 or to the magnet 50, the greater an absolute value of the magnetic flux density becomes. Further, the magnetic flux density is equal to 0 at the position P1.

Further, the magnetic flux at positions around the magnet 45 "flies" from the magnetic pole 46 to the magnetic pole 47, and the magnetic flux at positions around the magnet 50 "flies" from the magnetic pole 51 to the magnetic pole 52.

As shown in FIG. 2 and FIGS. 3A-3C, the Hall IC 60 has a Hall element 61 serving as a signal output element, as well as a sealer 62 and a sensor terminal 63. The Hall element 61 outputs a signal according to the density of the magnetic flux passing therethrough. The sealer 62 is made of resin and has a rectangular board shape, for example. A first end of the sensor terminal 63 is connected to the Hall element 61. The sealer 62 covers an entire Hall element 61, as well as the first end of the sensor terminal 63. In this case, the Hall element 61 is located at the center of the sealer 62.

The sealer 62 sealing the Hall IC 60 and the first end of the sensor terminal 63 is molded by a mold 9. The mold 9 is a resin mold, for example, and has a square pole shape. The sealer 62 sealing the Hall IC 60 is molded at a position on one end side of the mold 9.

The mold 9 is disposed on the cover 6 so that one end of the mold 9 is positioned in the gap 101 and the other end of the mold 9 is connected to the bottom of the cover 6. In such manner, the Hall IC 60 is rotatably moved, relative to the rotating body 12, in the gap 101 between the first magnetic flux transmission part 20 and the second magnetic flux transmission part 30. The cover 6 and the mold 9 are respectively equivalent to a reference part in the claims, and the rotating body 12 is equivalent to a detection object in the claims.

The sensor terminal 63 of the Hall IC 60 has a second end formed to be exposed in an inside of the connector 8 of the cover 6 by an insert-molding method in the cover 6. Therefore, when an end of the wire harness leading to the ECU 11 is connected to the connector 8, the Hall element 61 of the Hall IC 60 is connected to the ECU 11. Thereby, a signal from the Hall element 61 is transmitted to the ECU 11.

In this case, the magnetic flux passing through the Hall element 61 of the Hall IC 60 is mainly made of the spill magnetic flux which flows through the gap 101 between the first magnetic flux transmission part 20 and the second magnetic flux transmission part 30 either (i) from the second magnetic flux transmission part 30 to the first magnetic flux transmission part 20 or (ii) from the first magnetic flux transmission part 20 to the second magnetic flux transmission part 30.

In the present embodiment, the spill magnetic flux flows from the first magnetic flux transmission part 20 to the second magnetic flux transmission part 30 in an area between the position P1, that is shifted-toward-magnet 50, and the magnet 45 as mentioned above. The spill magnetic flux flows from the second magnetic flux transmission part 30 to the first magnetic flux transmission part 20 in an area between the position P1 and the magnet 50. Further, when a position along the longitudinal direction of the gap 101 is closer to the magnet 45 or to the magnet 50, the greater an absolute value of the magnetic flux density becomes.

Therefore, if assumed that a flow direction of the spill magnetic flux flowing from the second magnetic flux transmission part 30 to the first magnetic flux transmission part 20 is a negative direction, when a position of the Hall IC 60 rotatably moves from a proximity of the magnet 50 to a proximity of the magnet 45 in the gap 101, the magnetic flux density monotonically increases from a negative value to a positive value, thereby identifying a rotation position of the Hall IC 60 uniquely according to the detected magnetic flux density and thus outputting a signal that uniquely identifies the rotation position of the Hall IC 60.

According to the above-mentioned configuration, the ECU 11 is capable of detecting the rotation position of the rotating body 12 relative to the cover 6 based on the signal outputted from the Hall IC 60. In such manner, the rotation position and an opening degree of the throttle valve are detected.

The first magnetic flux collector 70 is made of a relatively high magnetically permeable material such as a permalloy or the like, and has a hexahedron body. The first magnetic flux collector 70 is disposed on a first side of the mold 9 so that a predetermined face 71 of the collector 70 faces or abuts a center of one face on a first magnetic flux transmission part 20 side of the sealer 62 of the Hall IC 60. An opposite face 72 of the first magnetic flux collector 70, which is opposite to the face 71, faces the center section 21 of the first magnetic flux transmission part 20.

The second magnetic flux collector 80 is, similar to the first magnetic flux collector 70, made of a relatively high magnetically permeable material such as a permalloy or the like, and has a hexahedron body. The second magnetic flux collector 80 is disposed on a second side of the mold 9 so that a predetermined face 81 of the collector 80 faces or abuts a center of one face on a second magnetic flux transmission part 30 side of the sealer 62 of the Hall IC 60. A face 82 of the second magnetic flux collector 80, which is opposite to the face 81, faces the center section 31 of the second magnetic flux transmission part 30.

Thus, the Hall IC 60 is sandwiched or bound in between the first magnetic flux collector 70 and the second magnetic flux collector 80, and such sandwiching or binding direction is substantially the same as the facing direction between the first magnetic flux transmission part 20 and the second magnetic flux transmission part 30. The spill magnetic flux which flows through the gap 101 between the first magnetic flux transmission part 20 and the second magnetic flux transmission part 30 is thus concentrated in such manner, and is directed to flow to (i.e., pass through) the Hall IC 60.

In the present embodiment, the minimum (i.e., zero in this embodiment) magnetic flux (MF) density position where an absolute value of the magnetic flux density is observed as 0 is changed/adjusted to any position (i.e., at the position P1 in this embodiment) between the magnet 45 and the magnet 50 along the longitudinal direction of relative movement of the Hall IC 60 in the gap 101 (i.e., along a path of relative movement direction of the IC 60), by an adjustment of the volume difference between the magnet 45 and the magnet 50, for example. In other words, the minimum MF density position may be moved and set to any position within the movable range of the rotating body 12 in the present embodiment, which may be a position other than the center position of the movable range.

Generally, at the minimum MF density position within the movable range of the Hall IC 60, where an absolute value of the magnetic flux density is observed as the minimum, the magnetic power of the magnet 45 and the magnet 50 changes minimally according to the temperature coefficient of those magnets. That is, the tolerance for the temperature change is improved at such position. Therefore, at the proximity of the minimum MF density position within the movable range of the Hall IC 60, the position detection accuracy of the position detector 10 is high.

According to the present embodiment, when the throttle valve is in a fully-closed state, the Hall IC 60 is located at a position closest to the magnet 50 in the movable range in the gap 101 (i.e., at the position P1). On the other hand, when the throttle valve is a fully-opened state, the Hall IC 60 is located at a position closest to the magnet 45 in the movable range in the gap 101.

The throttle valve position is required to have the highest position detection accuracy at or around a fully-closed position. As mentioned above, in the present embodiment, the minimum MF density position may be moved and set to any position within the movable range of the rotating body 12. Therefore, in the present embodiment, the minimum MF density position may be moved and set to a rotation position of the rotating body 12 which corresponds to the fully-closed position of the throttle valve. Therefore, the position detection accuracy at or around the fully-closed position of the throttle valve is improved irrespective of the temperature.

Figure 4:
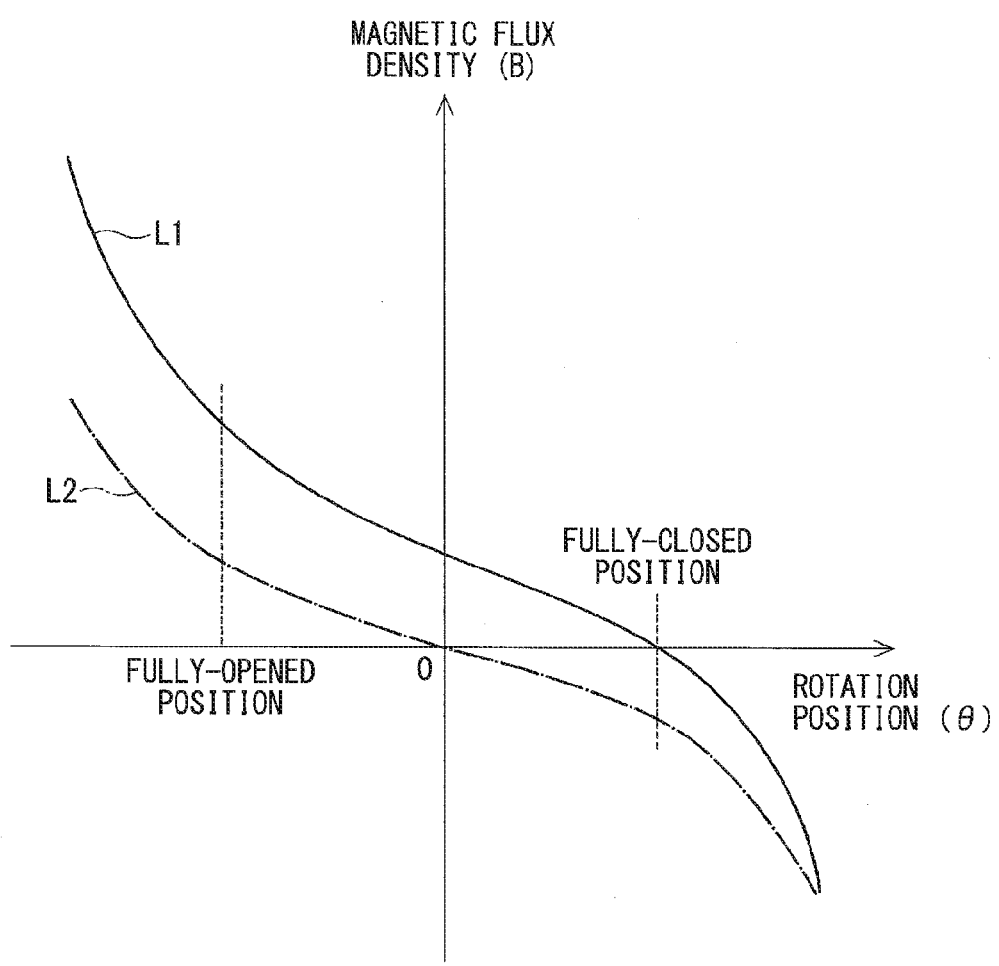
FIG. 4 is a figure illustrating a relationship between a position of a detection object relative to a reference part and a magnetic flux density that is detected by the magnetic flux density detector, in the first embodiment and in a comparative example.

According to the present embodiment, the magnetic flux density detected by the Hall IC 60 is illustrated by a line L1 in FIG. 4. In addition to the spill magnetic flux which flows between the first magnetic flux transmission part 20 and the second magnetic flux transmission part 30, the magnetic flux which "flies" from the magnetic pole 46 to the magnetic pole 47 of the magnet 45 and the magnetic flux which "flies" from the magnetic pole 51 to the magnetic pole 52 of the magnet 50 flow at or around the magnets 45 and 50 in the gap 101. Therefore, a change rate of the absolute value illustrated by the line L1 increases toward both ends of the line L1.

In the present embodiment, the relationship between the magnetic flux density and a position of the rotating body 12 in the movable range (i.e., a range between the fully-closed position and the fully-opened position of the throttle valve) is shown in FIG. 4. Thus, in the present embodiment, the position of the rotating body 12 is detected in a range in which the linearity of the line L1 is relatively high.

The advantageous points of the position detector in the present embodiment are clarified by describing a comparative example of a position detector in the following.

Figure 5:
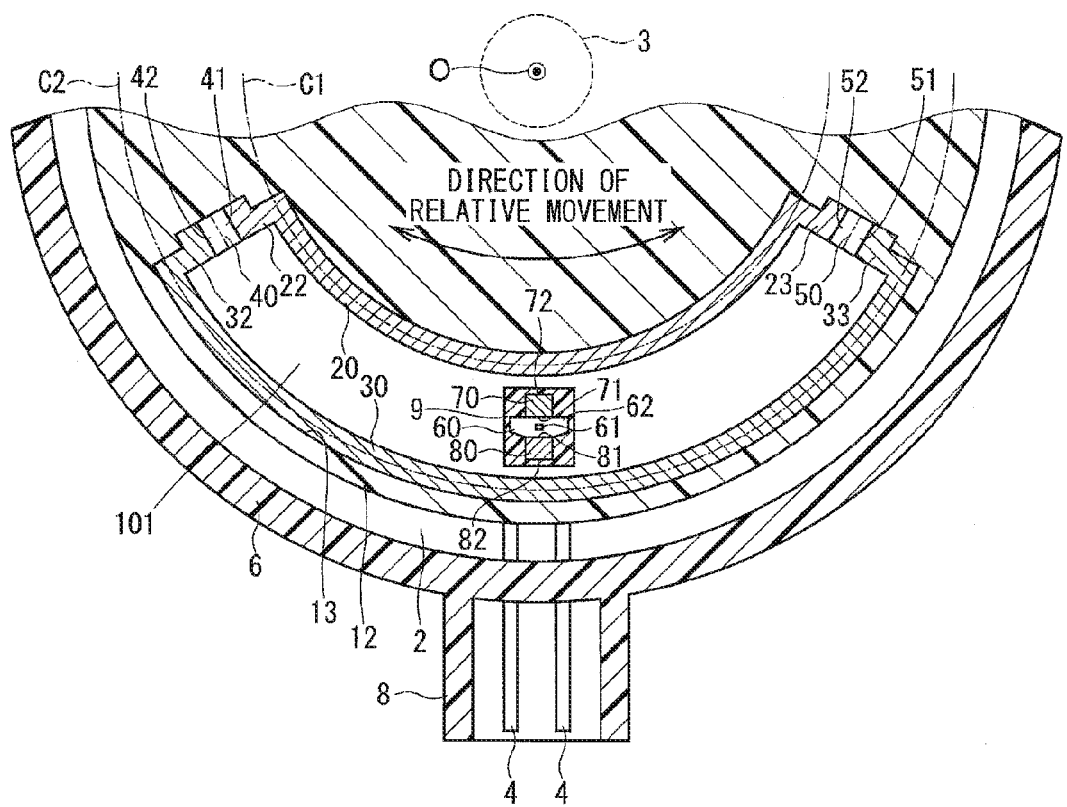
FIG. 5 is a sectional view of the position detector in the comparative example.

As shown in FIG. 5, in the comparative example, the magnet 45 in the first embodiment is replaced with a magnet 40.

The magnet 40 is a permanent magnet, such as a neodymium magnet, a ferrite magnet, or the like, for example, which has a magnetic pole 41 on one end and a magnetic pole 42 on the other end. The magnet 40 is magnetized to have the magnetic pole 41 serving as an N pole and the magnetic pole 42 serving as an S pole. The magnet 40 is disposed so that the magnetic pole 41 abuts the first end 22 of the first magnetic flux transmission part 20 and the magnetic pole 42 abuts the first end 32 of the second magnetic flux transmission part 30. Thereby, the magnetic flux generated by the magnetic pole 41 of the magnet 40 is transmitted from one end to the other end of the first magnetic flux transmission part 20.

Here, the spill magnetic flux flows through the gap 101 either (i) from the first magnetic flux transmission part 20 to the second magnetic flux transmission part 30 or (ii) from the second magnetic flux transmission part 30 to the first magnetic flux transmission part 20.

In the comparative example, the magnet 40 and the magnet 50 are respectively configured to be permanent magnets having the same volume, the same magnet type (e.g., a neodymium magnet, a ferrite magnet, etc.), the same material composition (e.g., the same rate of neodymium, iron, boron plus the same content rate of dysprosium etc. if the magnets 40, 50 are neodymium magnets; or the same contents rate of barium, strontium, etc. if the magnets 40, 50 are ferrite magnets), and the same magnetization adjustment method. Therefore, the flow of the spill magnetic flux at the longitudinal center of the gap 101 is zero, while the flow of the same flux flows from the second magnetic flux transmission part 30 to the first magnetic flux transmission part 20 in an area between the center of the gap 101 and the magnet 50 and the flow of the same flux flows from the first magnetic flux transmission part 20 to the second magnetic flux transmission part 30 in an area between the center of the gap 101 and the magnet 45. More specifically, the closer the position along the longitudinal direction of the gap 101 is to the magnet 45 or to the magnet 50, the greater an absolute value of the magnetic flux density becomes. Further, the magnetic flux density is equal to 0 at the longitudinal center of the gap 101.

Further, the magnetic flux at positions around the magnet 40 "flies" from the magnetic pole 41 to the magnetic pole 42, and the magnetic flux at positions around the magnet 50 "flies" from the magnetic pole 51 to the magnetic pole 52.

In the comparative example, the magnetic flux density detected by the Hall IC 60 is illustrated by a line L2 in FIG. 4, which is a dashed-dotted line. As such, the minimum MF density position in the comparative example is fixedly set at the center (i.e., position 0 in FIG. 4) of the movable range of the rotating body 12. Therefore, if the position detector in the comparative example is used to detect a position (i.e., an opening degree) of the throttle valve, the position detection accuracy at or around the fully-closed position of the throttle valve may be deteriorated.

On the other hand, in the present embodiment, the minimum MF density position is set at a rotation position of the rotating body 12 corresponding to the fully-closed position of the throttle valve. Therefore, the position detection accuracy at or around the fully-closed position is improved. Thus, the position detector in the present embodiment is capable of more suitably detecting a position (i.e., an opening degree) of the throttle valve in comparison to the detector in the comparative example.

As explained above, in the present embodiment, the minimum MF density position, where the absolute value of the magnetic flux density is observed as the minimum (i.e., zero in the present embodiment), is set at the position P1 that is shifted by a predetermined distance away from the longitudinal center toward the magnet 50 in the gap 101 (i.e., the shift of the position P1 from the longitudinal center along a direction of relative movement direction of the Hall IC 60 in the gap 101 between the first magnetic flux transmission part 20 and the second magnetic flux transmission part 30). That is, in the present embodiment, the minimum MF density position can be moved and set at any position other than the center of the movable range of the rotating body 12. Therefore, when the position detector 10 of the present embodiment is applied to the rotating body 12 (i.e., a throttle valve), such a position detector 10 is capable of moving the minimum MF density position to a desired position having the highest position detection accuracy.

Generally, at the minimum MF density position within the movable range of the Hall IC 60, the magnetic power of the magnet 45 and the magnet 50 is changes minimally according to the temperature coefficient of those magnets. That is, the tolerance for the temperature change is improved at such position. Therefore, in the present embodiment, the position detection accuracy is improved for any position within the movable range of the rotating body 12 (i.e., the throttle valve) irrespectively of the temperature.

In the present embodiment, the magnet 45 is a permanent magnet and the magnet 50 is provided as, relative to the magnet 45, a permanent magnet having at least one different attribute from among the volume, the type, the material composition, and the magnetization adjustment method. In other words, at least one of a magnet volume, a magnet type, a magnet material composition, or a magnetization adjustment method of the magnet 45 is different from the magnet 50. That is, in the present embodiment, the volume of the magnet 50 is different from the magnet 45. Thereby, the minimum MF density position may be moved and set at any position other than the center of the movable range of the rotating body 12.

Second Embodiment

Figure 6:
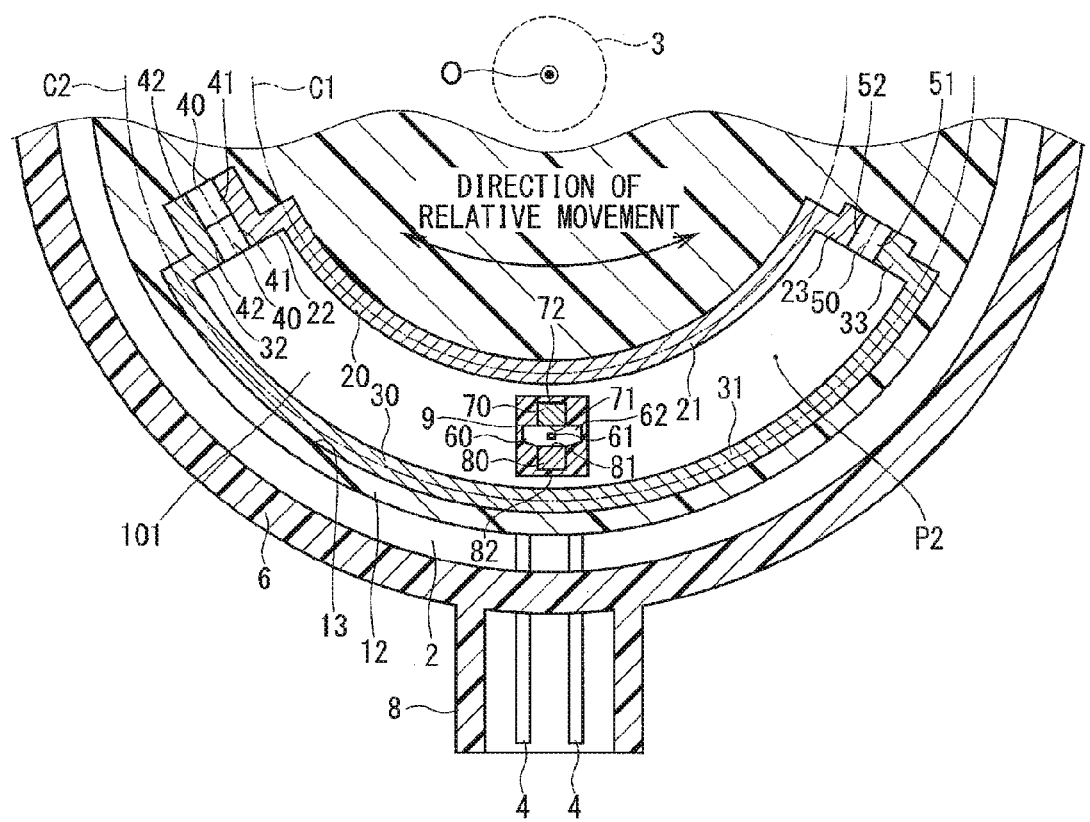
FIG. 6 is a sectional view of the position detector in a second embodiment of the present disclosure.

The position detector in the second embodiment of the present disclosure is shown in FIG. 6. In the second embodiment, the first magnetic flux generator is different from the first embodiment.

According to the second embodiment, the first magnetic flux generator has two pieces of the magnets 40. The magnet 40 is a magnet shown in the above-mentioned comparative example. That is, the magnet 40 and the magnet 50 are respectively configured to be permanents magnet having the same magnet volume, the same magnet type (e.g., a neodymium magnet, a ferrite magnet, etc.), the same material composition (e.g., the same rate of neodymium, iron, boron plus the same content rate of dysprosium etc. if the magnets 40, 50 are neodymium magnets; or the same contents rate of barium, strontium, etc. if the magnets 40, 50 are ferrite magnets), and the same magnetization adjustment method.

As shown in FIG. 6, two magnets 40 are arranged in parallel at a position between (i) the first end 22 of the first magnetic flux transmission part 20 and (ii) the first end 32 of the second magnetic flux transmission part 30 in the present embodiment. Here, the magnetic pole 41 of the two magnets 40 abuts the first end 22, and the magnetic pole 42 of the two magnets 40 abuts the first end 32.

By devising the above-mentioned configuration, the flow of the spill magnetic flux at a position P2, that is at a predetermined distance away from the longitudinal center toward the magnet 50 in the gap 101, is zero, while (i) the flow of the same flux flows from the second magnetic flux transmission part 30 to the first magnetic flux transmission part 20 in an area between the position P2 and the magnet 50 and (ii) the flow of the same flux flows from the first magnetic flux transmission part 20 to the second magnetic flux transmission part 30 in an area between the position P2 and the magnet 40. More specifically, the closer the position along the longitudinal direction of the gap 101 is to the magnet 40 or to the magnet 50, the greater an absolute value of the magnetic flux density becomes. Further, the magnetic flux density is equal to 0 at the position P2.

As explained above, in the present embodiment, the first magnetic flux generator has two permanent magnets (i.e., dual magnets 40) and the second magnetic flux generator has different number of the same permanent magnets (i.e., a single magnet 50 in this embodiment). That is, the same permanent magnet of the same volume, same type, same material composition, and same magnetization adjustment method is provided in different number of pieces on the right and left sides of the two magnetic transmission parts. In other words, the first magnetic flux generator has at least one permanent magnet, the second magnetic flux generator has a different number of permanent magnets as the first magnetic flux generator, and identical permanent magnets are used for the magnets 40 and the magnet 50.

Therefore, in the present embodiment, the minimum MF density position can be moved and set at any position other than the center of the movable range of the rotating body 12, similar to the first embodiment. Thus, the minimum MF density position can be moved and set to the rotation position of the rotating body 12, which corresponds to the fully-closed position of the throttle valve. As a result, the position detection accuracy at the proximity of the fully-closed position of the throttle valve is improved irrespective of the temperature.

Further, in the present embodiment, the first magnetic flux generator and the second magnetic flux generator are configured to have one or two same (i.e., standard) permanent magnets having the same attributes (i.e., volume/type/material composition/magnetization adjustment method). Therefore, the manufacturing cost for manufacturing different magnets having different attributes will be saved by using such standard magnet. Also, efficiencies from manufacturing such standard magnet in volume may be realized.

Third Embodiment

Figure 7:
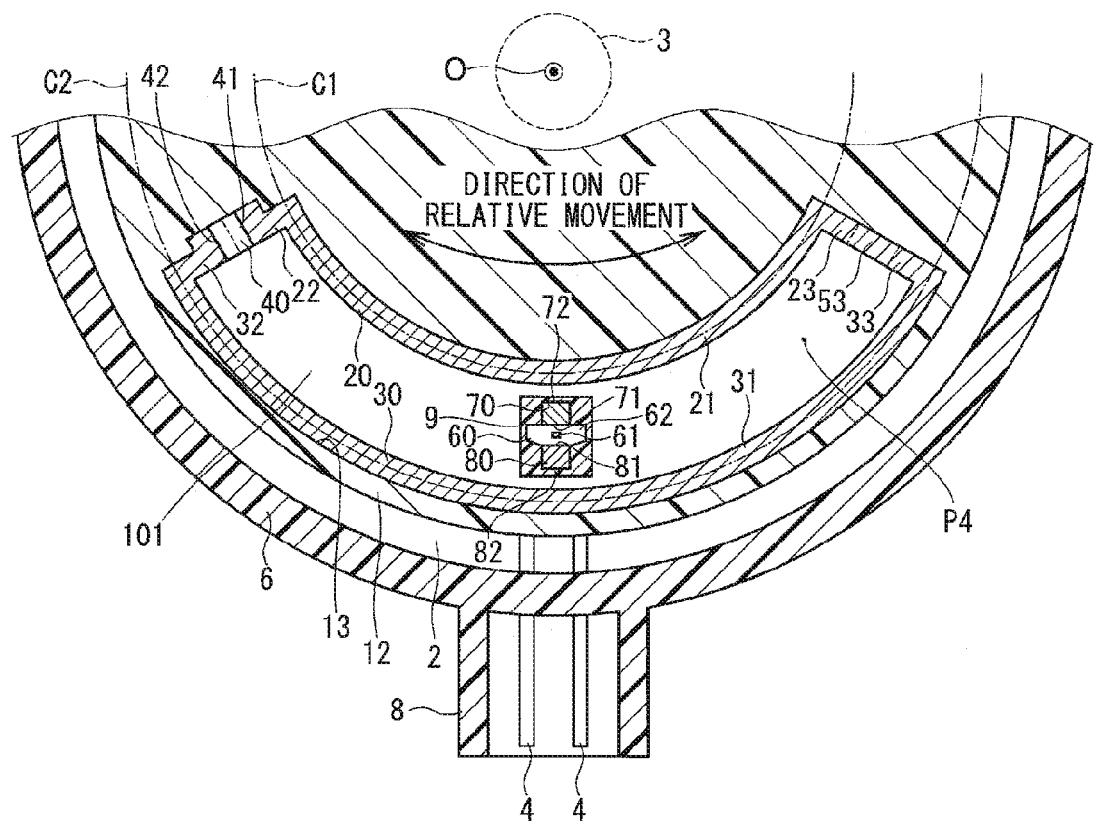
FIG. 7 is a sectional view of the position detector in a third embodiment of the present disclosure.

The position detector in the third embodiment of the present disclosure is shown in FIG. 7. According to the third embodiment, the position detector 10 has a third magnetic flux transmission part 53. The third magnetic flux transmission part 53 is disposed at a position between the second end 23 of the first magnetic flux transmission part 20 and the second end 33 of the second magnetic flux transmission part 30, and is made of the same material as the first magnetic flux transmission part 20 and the second magnetic flux transmission part 30, to be integrated to the first magnetic flux transmission part 20 and to the second magnetic flux transmission part 30. That is, in other words, the configuration of the position detector 10 in the third embodiment may be described as a replacement of the magnet 50 of the above-mentioned comparative example with the third magnetic flux transmission part 53.

According to the present embodiment, in an entire range of the longitudinal direction of the gap 101, the spill magnetic flux flows from the center section 21 of the first magnetic flux transmission part 20 to the center section 31 of the second magnetic flux transmission part 30. In such configuration, the closer the position in the gap 101 along the longitudinal direction is to the magnet 40, the greater the absolute value of the magnetic flux density becomes. Further, a position P4 that is shifted by a predetermined distance shifted away from the longitudinal center of the gap 101 (refer to FIG. 7) corresponds to the fully-closed position of the throttle valve.

Figure 8:
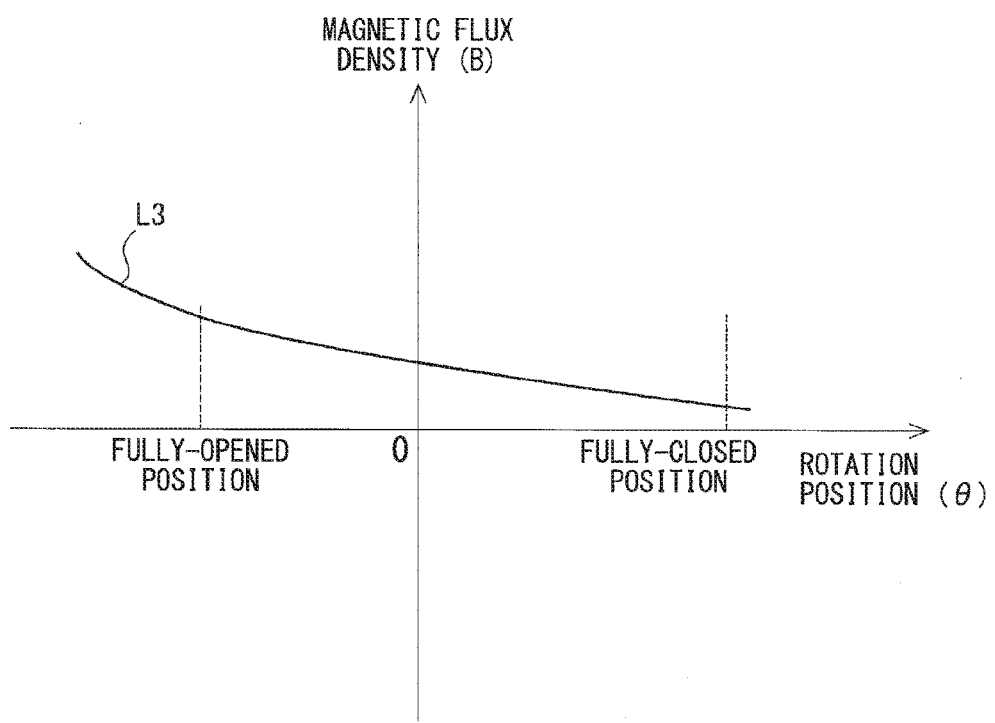
FIG. 8 is a diagram of a relationship between a position of the detection object relative to the reference part and the magnetic flux density that is detected by the magnetic flux density detector in the third embodiment of the present disclosure.

By devising the above-mentioned configuration, the magnetic flux density detected by the Hall IC 60 is illustrated by a line L3 in FIG. 8. That is, a relationship between the magnetic flux density and the position of the rotating body 12 in the movable range of the rotating body 12 (i.e., a range between the fully-closed position and the fully-opened position of the throttle valve) is illustrated in FIG. 8.

According to the present embodiment, the position P4 corresponds to the minimum MF density position (i.e., a non-zero minimum value in this case) within the range of relative movement of the Hall IC 60 (i.e., the range between the fully-closed position and the fully-opened position of the throttle valve). Therefore, the position detection accuracy at the proximity of the fully-closed position of the throttle valve is improved irrespective of the temperature.

Further, in the present embodiment, the manufacturing cost of the position detector 10 is reduced, since the detector 10 uses fewer permanent magnets in comparison to the above-mentioned embodiment.

Fourth Embodiment

Figure 9:
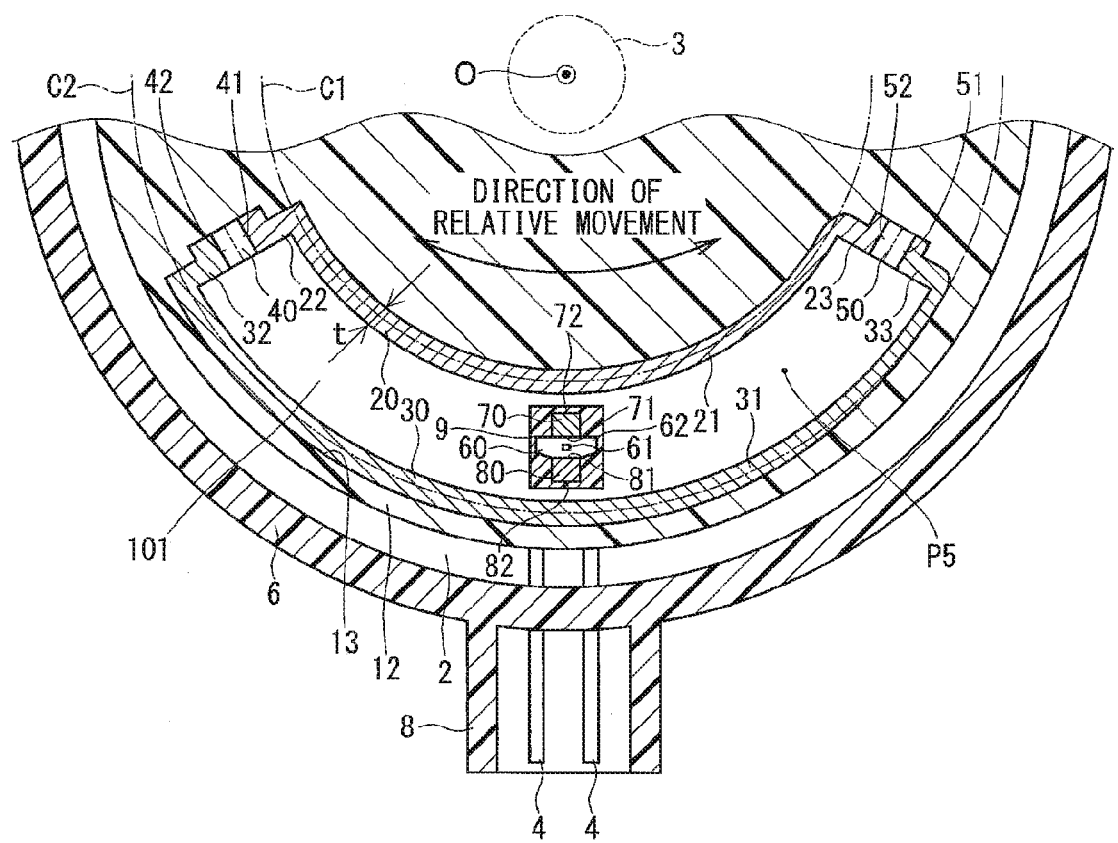
FIG. 9 is a sectional view of a position detector in a fourth embodiment of the present disclosure.

The position detector in the fourth embodiment of the present disclosure is shown in FIG. 9. According to the fourth embodiment, the width or thickness ('t' in FIG. 9) of both of the center sections 21, 31 of the first and second magnetic flux transmission parts 20, 30, respectively, which is measured perpendicularly at positions along the longitudinal direction of both of the center section 21 and the center section 31, is thinner as the width measurement position approaches the magnet 50 from the magnet 40. In other words, the thickness of at least one of the first magnetic flux transmission part 20 or the second magnetic flux transmission part 30 changes in a direction from the magnet 40 to the magnet 50.

In the above-mentioned configuration, as shown in FIG. 9, the flow of the spill magnetic flux at a position P5 that is shifted by a predetermined distance away from the longitudinal center toward the magnet 50 in the gap 101 is zero, while (i) the flow of the same flux flows from the second magnetic flux transmission part 30 to the first magnetic flux transmission part 20 in an area between the position P5 and the magnet 50 and (ii) the flow of the same flux flows from the first magnetic flux transmission part 20 to the second magnetic flux transmission part 30 in an area between the position P5 and the magnet 40. Further, the magnetic flux density is equal to 0 at the position P5.

According to the present embodiment, the minimum MF density position is set to the rotation position of the rotating body 12 which corresponds to the fully-closed position of the throttle valve, similar to the first embodiment. Therefore, the position detection accuracy at the proximity of the fully-closed position of the throttle valve is improved irrespective of the temperature.

Further, in the present embodiment, the first magnetic flux generator and the second magnetic flux generator are configured to have one or two same (i.e., standard) permanent magnets having the same attributes (i.e., volume/type/material composition/magnetization adjustment method). Therefore, the manufacturing cost for manufacturing different magnets having different attributes will be saved by using such standard magnet. Also, efficiencies from manufacturing such standard magnet in volume may be realized.

Fifth Embodiment

Figure 10:
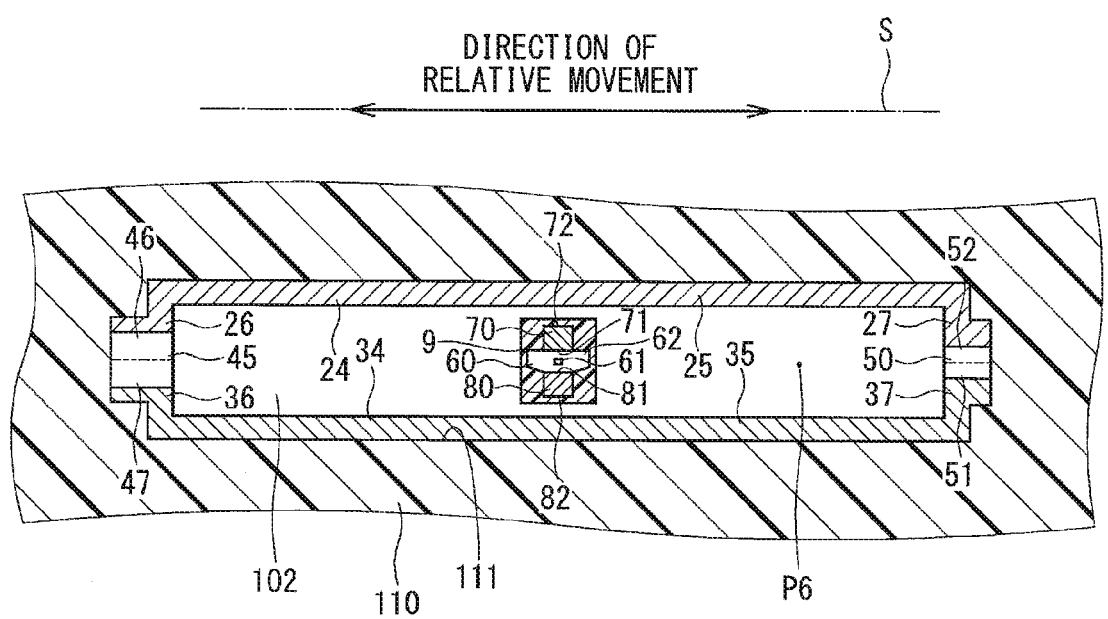
FIG. 10 is a sectional view of a position detector in a fifth embodiment of the present disclosure.

The position detector in the fifth embodiment of the present disclosure is shown in FIG. 10. In the fifth embodiment, the shape of the first magnetic flux transmission part and the second magnetic flux transmission part is different from the first embodiment together with other attributes.

According to the fifth embodiment, a mover 110 serving as a detection object is attached to a manual valve which switches a shift of a gearbox of a vehicle, for example. The manual valve moves linearly in an axial direction, for switching the shift of the gearbox. The mold 9 is fixed onto a separate member that is close to but separate from the manual valve. That is, the mover 110 moves linearly relative to the mold 9 that serves as a reference part.

According to the present embodiment, the position detector detects the position of the mover 110 that moves linearly relative to the mold 9. Thereby, the position of the manual valve is detected and an actual shift position of the gearbox is detected. Thus, the position detector can be used as a stroke sensor (i.e., a linear movement sensor).

As shown in FIG. 10, in the present embodiment, a first magnetic flux transmission part 24 is disposed in a cavity 111 having a rectangular shape that is bored in the mover 110. The first magnetic flux transmission part 24 has a center section 25, a first end 26, and a second end 27. The center section 25 has a straight shape which is parallel to a virtual straight line S extending in a direction of the relative movement of the mover 110. The first end 26 extends substantially perpendicular from one end of the center section 25 relative to the virtual straight line S. The second end 27 extends from the other end of the center section 25 in the same direction as the first end 26.

A second magnetic flux transmission part 34 is also disposed in the cavity 111 of the mover 110. The second magnetic flux transmission part 34 has a center section 35, a first end 36, and an second end 37. The center section 35 has a straight shape which is in parallel with the virtual straight line S similar to the center section 25. The first end 36 extends substantially perpendicularly from one end of the center section 35 relative to the virtual straight line S, to face the first end 26. The second end 37 extends from the other end of the center section 35 in the same direction as the first end 36.

In other words, the mover 110 moves linearly relative to the reference part 9, and the first magnetic flux transmission part 24 and the second magnetic flux transmission part 34 have a straight shape that extends along a path of relative movement of the mover 110.

As shown in FIG. 10, the first magnetic flux transmission part 24 and the second magnetic flux transmission part 34 are formed in the cavity 111 of the mover 110 so that the center section 25 and the center section 35 face each other in a direction that is perpendicular to the virtual straight line S. Thereby, a rectangular shape gap 102 is defined between the center section 25 of the first magnetic flux transmission part 24 and the center section 35 of the second magnetic flux transmission part 34.

The configuration of the fifth embodiment is similar to the first embodiment, other than the above-described points.

According to the present embodiment, the magnetic flux density detected by the Hall IC 60 is substantially illustrated as a line L1 shown in FIG. 4, if "a rotation position (θ)" of FIG. 4 is read as a "position" in a path of relative movement direction of the mover 110.

In the present embodiment and similar to the first embodiment, the volume of the magnet 45 is different from the volume of the magnet 50. Thereby, the minimum MF density position is set at any position other than the longitudinal center of the movable range of the mover 110. Therefore, when the position detector of the present embodiment is applied to the mover 110 (i.e., a manual valve) which is required to have the highest position detection accuracy at any position other than the center of the movable range, the minimum MF density position may be positioned where the position detection accuracy is required to be highest.

Other Embodiments

In the above-mentioned first embodiment, the magnet serving as the first magnetic flux generator and the magnet serving as the second magnetic flux generator are respectively different from each other in their volumes. On the other hand, in other embodiments of the present disclosure, the magnet serving as the second magnetic flux generator may be provided as a permanent magnet having at least one different attribute from the magnet serving as the first magnetic flux generator, from among the following attributes of the volume, the type, the material composition, and the magnetization adjustment method. In such manner, the minimum MF density position may be moved and set at any position other than the center of the movable range of the detection object.

In the second embodiment mentioned above, an example of having the same standard magnet in different numbers for the first and second magnetic flux generator is described. That is, in the second embodiment, the first magnetic flux generator has only one standard magnet, while the second magnetic flux generator has two standard magnets, which have the same volume/type/material composition/magnetization adjustment method. On the other hand, in other embodiments of the present disclosure, as long as the number of such standard magnets differs between the first magnetic flux generator and the second magnetic flux generator, the number of the permanent magnets (i.e., the standard magnets) may be arbitrarily determined.

In the third embodiment described above, the second magnetic flux generator is replaced with the third magnetic flux transmission part made of the same material as the first magnetic flux transmission part and the second magnetic flux transmission part. On the other hand, in other embodiments of the present disclosure, the first magnetic flux generator, instead of the second magnetic flux generator, may be replaced with the third magnetic flux transmission part.

In the fourth embodiment described above, the widths of the first magnetic flux transmission part and the second magnetic flux transmission part are respectively thinned toward the second magnetic flux generator. On the other hand, in other embodiments of the present disclosure, the first magnetic flux transmission part and the second magnetic flux transmission part may be formed to have a greater width toward the second magnetic flux generator. Further, the width of only one of the first and second magnetic flux transmission parts, may be thinned or widened toward the second magnetic flux generator.

In the above-mentioned embodiment, it is described that the first magnetic flux transmission part, the second magnetic flux transmission part, the first magnetic flux generator, and the second magnetic flux generator are disposed on the detection object, and the magnetic flux density detector is disposed on the reference part. On the other hand, in other embodiments of the present disclosure, the first magnetic flux transmission part, the second magnetic flux transmission part, the first magnetic flux generator, and the second magnetic flux generator may be disposed on the reference part, and the magnetic flux density detector may be disposed on the detection object.

In other embodiments of the present disclosure, the polarity of the magnet disposed at a position between the both ends of the first magnetic flux transmission part and the second magnetic flux transmission part may be flipped or reversed from the positions reflected in the above-described embodiments.

Further, in other embodiments of the present disclosure, the motor may have a speed reducer for reducing the number of rotations to be transmitted to the output shaft.

Additionally, in other embodiments of the present disclosure, each of the above-mentioned embodiments may be combined with other embodiments.

Moreover, in other embodiments of the present disclosure, an actuator may be used, for example, as a driving power source of various devices, such as a wastegate valve operation device, a variable vane control device of a variable capacity turbocharger, a valve operation device of an exhaust throttle or an exhaust switch valve, a valve operation device of a variable air intake mechanism, and the like.

Although the present disclosure has been fully described in connection with the above embodiment thereof with reference to the accompanying drawings, it is to be noted that various changes and modifications will become apparent to those skilled in the art, and such changes and modifications are to be understood as being within the scope of the present disclosure as defined by the appended claims.

What is claimed is:

1. A position detector configured to detect a position of a detection object that moves relative to a reference part, the position detector comprising:
    a first magnetic flux transmission part disposed on one of the detection object or the reference part, the first magnetic flux transmission part having a first end and a second end;
    a second magnetic flux transmission part disposed to define a gap between the first magnetic flux transmission part and the second magnetic flux transmission part, the second magnetic flux transmission part having a first end and a second end;
    a first magnetic flux generator positioned between the first end of the first magnetic flux transmission part and the first end of the second magnetic flux transmission part;
    a second magnetic flux generator positioned between the second end of the first magnetic flux transmission part and the second end of the second magnetic flux transmission part; and
    a magnetic flux density detector disposed on another of the detection object or the reference part to be movable within the gap relative to the one of the detection object or the reference part and configured to output a signal according to a density of a magnetic flux passing through the magnetic flux density detector, wherein
    a minimum magnetic flux density position of the magnetic flux density detector within the gap, where an absolute value of the density of the magnetic flux passing through the magnetic flux density detector decreases to a minimum, is set to a position that is shifted away from a center of the gap by a predetermined distance toward one of the first magnetic flux generator or the second magnetic flux generator, and wherein
    both the first magnetic flux generator and the second magnetic flux generator have at least one permanent magnet and one of the first magnetic flux generator and the second magnetic flux generator has more permanent magnets than the other of the first magnetic flux generator and the second magnetic flux generator.

2. The position detector of claim 1, wherein the detection object rotates relative to the reference part, and
    the first magnetic flux transmission part and the second magnetic flux transmission part have a curve shape that is concentric to a center of rotation of the detection object.

3. The position detector of claim 1, wherein the at least one permanent magnet of the first magnetic flux generator includes multiple permanent magnets and the at least one permanent magnet of the second magnetic flux generator has one permanent magnet, and wherein
    the permanent magnets of the first magnetic flux generator are oriented polarity-wise in a same direction, such that a same pole of each of the permanent magnets in the first magnetic flux generator is oriented toward the first magnetic flux transmission part, and such that a pole of the permanent magnet in the second magnetic flux generator is oriented toward the second magnetic flux transmission part, and the pole of the permanent magnet in the second magnet flux generator is the same polarity as the same pole.

4. The position detector of claim 3, wherein the same pole is a north pole.

* * * * *